July 31, 1956

F. T. GARDNER 2,757,066

CORROSION PREVENTION

Filed Sept. 17, 1952

Frank T. Gardner Inventor

By W. O. T. Heilman Attorney

United States Patent Office 2,757,066
Patented July 31, 1956

2,757,066

CORROSION PREVENTION

Frank T. Gardner, Tulsa, Okla., assignor to Esso Research and Engineering Company, a corporation of Delaware Application September 17, 1952, Serial No. 310,055

2 Claims. (Cl. 21—2.5)

This invention relates to a process for reducing or minimizing metal corrosion in vessels carrying or containing material which evolves or tends to evolve corrosive acid vapors. More particularly this invention is directed to the prevention of corrosive action in the vapor space of tanks in which is stored sour petroleum crude oil. The present application is a continuation in part of co-pending application Serial Number 660,019, filed April 6, 1946, now abandoned and of co-pending application Serial No. 38,563, filed July 13, 1948, also now abandoned.

The storing of so-called sour crude oil in steel tanks presents a serious problem in that such crude oil gives off vapors of sulfur-containing compounds, particularly hydrogen sulfide, which vapors in conjunction with any moisture and oxygen that may be present cause extensive corrosion of the tank, particularly in that portion which encloses the vapor space above the stored liquid. It has been noted that when sour crude oil is stored in a tank the vapor in the space above the liquid level will ordinarily contain hydrogen sulfide in volume concentrations lying within the average range of from about 0.2 per cent to about 8 per cent. Normally, the maximum hydrogen sulfide concentration will be about 2 or 3 per cent. During normal operation of the tank, that is during filling and emptying or even during a period when no oil is added or removed from the tank, air and water vapor will find their way into the vapor space above the liquid. Hydrogen sulfide in the presence of droplets of condensed moisture and particularly in the added presence of air or oxygen is extremely corrosive to the metal surface of the tank and can cause a considerable loss of metal from the inside of the tank in a relatively short period of time.

Extensive study of the problem of corrosion by hydrogen sulfide and similar sulfur-conaining gases has revealed that hydrogen sulfide is relatively non-corrosive to metal surfaces even when moisture is present, provided no air or oxygen is present. On the introduction of air or oxygen, however, corrosion rates rise rapidly, and serious corrosion can occur with an oxygen cncentration as low as 2% in the presence of hydrogen sulfide.

It has further been noted that an increase in the per cent oxygen concentration has a much greater effect on the corrosion rate for a given hydrogen sulfide concentration than does a similar increase in the per cent of hydrogen sulfide for a given concentration of oxygen. A very severe corrosive condition occurs when 15 to 20 volume per cent oxygen is present and when the hydrogen sulfide concentration is as low as 0.2 per cent. In general it has been found in field operations that when the oxygen concentration is relatively high the hydrogen sulfide concentrations will be fairly low so that when the vapor space of a tank contains oxygen in the volume per cent range of about 15 to 20, the hydrogen sulfide concentration will be no higher than 2 or 3 per cent.

The presence of such high oxygen concentrations can readily occur in a storage tank that has not been tightly sealed so that air has more or less free access to the inside of the tank. When the tank has been exposed to the sun or to high atmospheric temperatures during the daytime and then cools off during the night, "breathing" occurs and moist air is drawn into the tank. If the temperature falls below the dew point, droplets of moisture form on the exposed internal surfaces of the tank and subsequent corrosion occurs as a result of the combined action of this moisture and hydrogen sulfide and oxygen present in the vapor space.

Attempts have previously been made to reduce this corrosion by coating the inside surface of such storage tanks with various protective materials, but this procedure has not proved very successful for various reasons, including insufficient adhesiveness of the coating to the tank surface, solvent action of the stored liquid on the coating, breaks or discontinuities in the coating, etc.

It is an object of the present invention to provide an efficient process for reducing or preventing corrosion in the vapor space of storage tanks containing liquids which evolve corrosive vapors. Other and further objects of the present invention will be apparent from the ensuing description.

In accordance with the present invention it has now been found that the corrosion of metal exposed to the vapor space of a storage tank containing sour crude petroleum oil can be prevented or reduced to a minimum by maintaining in the vapor space relatively small quantities of gaseous ammonia. The amount of ammonia required for this purpose is far less than the amount that would be necessary to neutralize all of the hydrogen sulfide or acidic constituents of the vapor existing in the tank. Although previous suggestions have been made to employ ammonia to minimize corrosion in storage vessels, oil treating apparatus, and the like, the suggested procedures have always employed aqueous solutions of ammonium hydroxide which are introduced into the apparatus or storage tank or into the liquid being stored or treated. Furthermore, in these previous methods the amounts of ammonia employed have always been at least sufficient to neutralize all of the acidity encountered.

In accordance with the present invention the corrosion of storage tanks containing crude oils or other liquids tending to evolve hydrogen sulfide gas can be effectively prevented by introducing into the vapor space gaseous ammonia in amounts equivalent to 20 volume per cent or less of the amount theoretically required to convert all of the hydrogen sulfide present to ammonium sulfide as shown by the following equation:

$$2NH_3 + H_2S \rightarrow (NH_4)_2S$$

In general it has been found that from about 3% to about 20% of the theoretical amount of ammonia is sufficient. That such small percentages of gaseous ammonia will effectively eliminate corrosion is indeed surprising since it has previously been thought necessary to neutralize completely all acidic constituents present in order to prevent corrosion. Thus when employing the present invention corrosion can be prevented easily and at relatively little expense. In practicing this invention, it is merely necessary to inject very small amounts of gaseous ammonia into the vapor space of the tank at regular intervals so that a small concentration of ammonia will always be present in the tank. Alternatively, it is merely necessary to introduce into the vapor space a compound evolving ammonia gas. A suitable compound of this nature is ammonium carbonate. This material or other materials that readily evolve ammonia may be suspended within the vapor space by any suitable means, as for example by placing the material in a perforated container positioned within the tank.

The nature and objects of this invention will be more readily understood when reference is made to the ensuing description and examples and to the acompanying drawing, in which.

Figure 1:
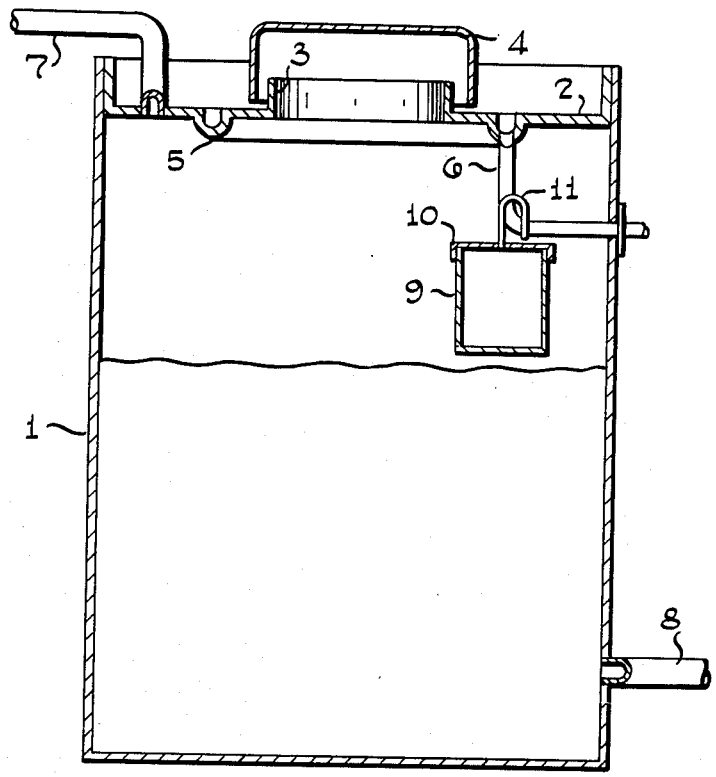
Fig. 1 is a vertical section through a representative crude oil storage tank, showing one form of container in place.

Referring to the drawing in detail, numeral 1 designates a tank having a welded roof 2 with a central opening 3 covered by a hatch 4. The roof has a grove or gutter 5 drained by a pipe 6 which discharges through the side of the tank. The tank has an inlet 7 in its roof for the introduction of crude oil to be stored and a draw-off line 8 near its bottom. It will be understood that there are other accessories in such a tank which are not mentioned here since they are not directly related to the present invention.

When employing a solid compound such as ammonium carbonate as the source of the ammonia atmosphere for the vapor space of the tank when practicing this invention, it is sufficient to hang from any suitable place or point in the vapor space of the tank, as, for example, from the drain line 6, a container 9 having perforated walls and an open end across which is fixed a strip 10 to which is affixed a hook 11 for hanging the container on the drain line. The container is charged with ammonium carbonate. The size of the container may, of course, be varied to suit the individual conditions and, likewise, the amount of ammonium carbonate employed for a single charge can be varied.

Figure 2:
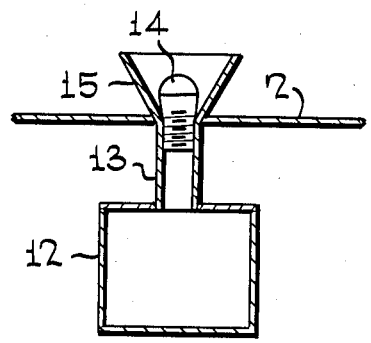
Fig. 2 is a vertical sectional view of a portion of such a tank showing an alternate form of container.

An alternative arrangement is shown in Figure 2. Instead of employing a container which for replenishment requires removal of the hatch 4 there may be welded to the cover 2 a similar perforated container 12 having its neck 13 provided with a suitable stopper 14 above which is a funnel 15 through which the container may be charged from time to time.

When employing gaseous ammonia in practicing this invention it is merely necessary to inject the desired amount of ammonia by any suitable means, as by a pipe entering the tank and terminating in the center of the upper portion of the vapor space. It is generally preferable to inject the ammonia gas near the center of the vapor space rather than at one side of the tank in order that loss of ammonia through tank vents may be minimized. The amount of gas introduced may be measured by any suitable means such as metering devices, weighing of gas cylinders before and after release of the gas, etc.

Figure 3:
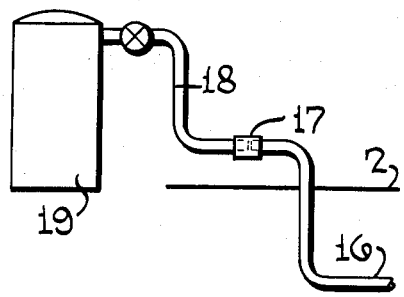
Fig. 3 is a similar sectional view of a portion of such a tank showing one means for introducing gaseous ammonia into the tank.

One suitable arrangement for introducing gaseous ammonia into a storage tank is depicted in Fig. 3. Welded, or otherwise suitably fastened to the underside of the roof 2 a perforated distributing ring or other device 16 terminating above the roof in a nipple 17 to which may be secured the hose 18 of an ammonia gas cylinder 19. It is frequent practice to employ crude oil storage tanks in batteries, each tank having a vent and all the vents being connected into a common manifold. With such an arrangement it is convenient in practicing this invention to introduce the gaseous ammonia into the manifold in the required quantities.

Laboratory experience indicates that for a fairly tight tank from about 5 to 12 per cent of the ammonia theoretically required for conversion of the hydrogen sulfide present in the vapor space of the tank to ammonium sulfide is sufficient to prevent corrosion. However, in actual field practice it may be necessary to employ as much as 20 per cent of the amount of ammonia theoretically necessary in order that allowance can be made for leakage from old or loose tanks. Loose tanks are defined as those in which corrosion holes and the like are present in the roof and adjacent areas. This maximum amount of 20 per cent ammonia has been found to be entirely satisfactory to protect tanks from corrosion by hydrogen sulfide under the worst conditions that have been encountered, i. e., when oxygen is present in concentrations as high as 17 to 20 per cent. When the conditions are fairly mild as little as 3 per cent of the theoretical amount of ammonia will be found to be entirely adequate.

As was previously indicated the corrosive action of hydrogen sulfide is greatly aggravated by the presence of oxygen. It has been found that in a vapor space containing 2 volume per cent hydrogen sulfide and up to 5 volume per cent of oxygen, corrosion can be effectively prevented by injecting 0.2 volume per cent ammonia gas. When 15 to 20 per cent of oxygen is present in addition to 2 per cent hydrogen sulfide, 90 to 95 per cent retardation of corrosion can be effected by adding 0.4 volume per cent of ammonia and under the same conditions 0.8 volume per cent of ammonia will give 95 to 100 per cent retardation of corrosion.

Since the volume ratio of ammonia to hydrogen sulfide for conversion of the latter to ammonium sulfide is two to one as shown by the chemical equation given above, it will be seen from the data just presented that even under very serious corrosion conditions substantially complete protection was obtained when employing only 10 to 20 per cent of the amount of ammonia theoretically required to convert the hydrogen sulfide to ammonium sulfide; and that under milder conditions only about 5 per cent was needed.

The effectiveness of the present invention is further illustrated by actual field tests that have been conducted on steel storage tanks of 55,000 barrel capacity. In these tests the storage tanks were maintained in normal operation for storing an Arkansas sour crude oil, which on analysis was found to contain from about 2 to about 4 cubic feet of evolvable hydrogen sulfide per barrel. Test periods were maintained for a sufficient time to average out fluctuations in the amount of oil each tank contained. In other words the tests were conducted for a sufficiently long period of time so that the tanks at some time would be full or nearly full and at other times would be empty. On the average each tank was alternately filled and emptied in about 4 or 5 day cycles. In one set of tests, a 14-day period was employed and to one tank 10 pounds of gaseous ammonia was added each day for the total period of 14 days, the ammonia being released into the vapor space in the vicinity of the center of the top of the tank. In the vapor space of this tank were placed sandblasted steel panels that had been first carefully weighed.

The test panels were bolted to the manhole cover in the roof of the tank in order that they would be given the fullest opportunity to accumulate condensed moisture in the same manner as the walls and roof of the tank and thus be subjected to the same corrosive conditions as the latter surfaces. Similar weighed panels were placed in the vapor space of another tank subject to the same storage operation but to which no ammonia was added. At the end of the test it was found that the steel panels placed in the tank to which ammonia had been added had lost an average of 2.9 milligrams of material per square decimeter per day. The steel panels that were placed in the unprotected tank were found to have lost 218 milligrams per square decimeter per day. From these figures it may be calculated that the percentage of corrosion retardation in the tank protected by injection of ammonia is equal to $$\frac{218-2.9}{218} \times 100 \text{ or } 98.7$$

In a similar set of tests conducted over a period of 37 days the addition of 15 pounds of ammonia per day to one tank effected a corrosion retardation of about 98.6 per cent as compared with a tank that had not been protected by ammonia injection. A third set of tests resulted in a 73 per cent corrosion retardation by injecting 8 pounds of ammonia per day into a 55,000 barrel capacity storage tank. In all of these tests it was found that the hydrogen sulfide concentration in the vapor space of the tanks was within the range of 0.5 to 2 volume per cent, and oxygen was present to the extent of about 15 to 18 volume per cent concentration.

Assuming that during the tests described above each tank was on the average half full of crude oil, calculations on the basis of injecting 10 to 15 pounds of anhydrous ammonia per day into each of the protected tanks indicate that the vapor space in each tank received an equivalent of about 0.13 to 0.20 volume per cent of ammonia each day. In general it will be found that adequate protection against corrosion will be obtained by injecting ammonia into the vapor space of a storage tank in an amount to produce a volume concentration of ammonia in the range of 0.1 to 0.8 volume per cent. The amount actually required will be governed by the amount of hydrogen sulfide evolved by the particular crude oil stored in the tank and also by the relative tightness of the tank, the latter factor governing the amount of oxygen (i. e. air) present and the rate of leakage of ammonia from the vapor space. For the worst conditions encountered, i. e., where the oxygen concentration is high (15 to 20 per cent) and appreciable amounts of hydrogen sulfide and moisture are present, it will be found that 0.8 volume per cent ammonia will be ample to give adequate corrosion prevention. In actual practice of this invention the effectiveness of the ammonia injection can be checked by the daily inspection of small steel panels placed in the vapor space of the tanks and the amount of ammonia then adjusted to prevent corrosion effectively.

The amount of ammonia that was effective in preventing corrosion in the above described field tests can also be calculated on a barrel basis. On this basis it will be seen that 10 to 15 pounds of ammonia per 55,000 barrel storage tank per day is equivalent to about 0.0002 to 0.0003 pound of ammonia per barrel capacity per day.

To illustrate the effectiveness of ammonium carbonate as a source of ammonia for the practice of this invention, reference may be made to the following tests:

Four glass vessels were selected having removable covers consisting of mild steel panels of exact known weight provided with central vents, the vessels being of suitable size to furnish a vapor space after the desired liquids were placed therein. Vent tubes provided with small bulb containers were inserted into the central vents of two of the vessels, each of these bulbs containing 0.5 gram of ammonium carbonate, the bulbs being placed so that the contents would be exposed to the vapor space within the vessels.

After the vessels had been assembled 5 ml. of hot distilled water was added to a 50 ml. beaker which had been placed in each vessel, the beakers being suitably weighted to prevent tipping and loss of the water therefrom, and the vessels were allowed to stand closed for two minutes. Then 200 ml. of sour Arkansas Mix crude oil containing hydrogen sulfide in the range of 3 to 4 cubic meet per barrel was added to each vessel, the vessels were closed and each was placed outdoors for twenty four hours. The vessels were then disassembled and the test panels removed and weighed. The panels exposed to the vapor spaces in which no ammonium carbonate was present were found to habe lost an average of about 219 milligrams of material per square decimeter of area whereas neither of the panels exposed to the vapor spaces containing ammonium carbonate showed any loss or gain in weight.

In field tests it has been found that in a 300 barrel tank used for storing sour crude petroleum oil containing evolvable hydrogen sulfide in sufficient quantities to cause substantial corrosion to the metal in the vapor space of the tank over a period of 60 days, a 5 pound charge of ammonium carbonate in the vapor space will suffice to provide protection against corrosion for a period of about two weeks. Thus, it follows that adequate protection may be afforded by adding to a storage tank 2 or 3 pounds of ammonium carbonate per week per 300 barrels of storage capacity.

It will be seen from the foregoing that this invention embraces the prevention of corrosion in the vapor space of a storage tank for sour crude petroleum oil by maintaining in the said vapor space ammonia in corrosion inhibiting concentrations, these concentrations supplying ammonia in quantities considerably less than would be required to neutralize the corrosive vapors completely.

It is to be understood that as used in the claims the expressions: maintaining ammonia, or, introducing ammonia, are intended to embrace the introduction of ammonia in corrosion inhibiting quantities by any suitable means, including the introduction of ammonia as such or as a compound evolving ammonia, such as ammonium carbonate, as fully disclosed in the foregoing specification.

Although this invention has been described with particular emphasis on its use in preventing corrosion of storage tanks in the presence of sour crude oils, it will be obvious to anyone skilled in the art that the essential features of the invention can likewise be applied in any instance in which corrosion occurs as a result of the presence of corrosive sulfur containing vapors, and particularly as a result of the presence of hydrogen sulfide, moisture and air or oxygen, in a metal tank.

It is not intended that this invention be limited in any manner by any theory regarding its operation.

What is claimed is:

1. Process for minimizing corrosion in the presence of moisture and oxygen in the vapor space of a metal vessel containing sour petroleum oil evolving hydrogen sulfide vapor which comprises maintaining in the said vapor space gaseous ammonia in amounts equal to from about 3 per cent to 20 per cent of the amount theoretically required to convert said hydrogen sulfide vapors to ammonium sulfide.

2. Process as defined by claim 1 in which the said ammonia is maintained within the said vapor space by suspending in the vapor space of the metal vessel a body of ammonium carbonate.

References Cited in the file of this patent

UNITED STATES PATENTS

| | | |
|---|---|---|
| 1,844,475 | Morrell | Feb. 9, 1932 |
| 2,185,954 | Ryner | Jan. 2, 1940 |
| 2,326,968 | Pomeroy | Aug. 17, 1943 |
| 2,357,559 | Smith | Sept. 5, 1944 |